United States Patent [19]
Daniel

[11] Patent Number: 4,944,111
[45] Date of Patent: Jul. 31, 1990

[54] HOOK AND LINE MINDER

[76] Inventor: Gordon S. Daniel, 3243 Rio Grande Trail, Kissimmes, Fla. 32741

[21] Appl. No.: 330,073

[22] Filed: Mar. 29, 1989

[51] Int. Cl.⁵ .............................................. A01K 97/06
[52] U.S. Cl. ...................................... 43/25.2; 43/57.1
[58] Field of Search ............................... 43/25.2, 57.1

[56] References Cited

U.S. PATENT DOCUMENTS

| | | | |
|---|---|---|---|
| D. 217,663 | 5/1970 | Chamberlain | 43/25.2 |
| 2,285,888 | 6/1942 | Benton | 43/25.2 |
| 3,199,243 | 8/1965 | Caston | 43/57.1 |
| 3,940,873 | 3/1976 | Lawless | 43/57.1 |
| 4,203,245 | 5/1980 | Peterson | 43/25.2 |
| 4,418,490 | 12/1983 | Ancona | 43/25.2 |

FOREIGN PATENT DOCUMENTS 144620  3/1954  Sweden .................... 43/25.2

Primary Examiner—Kurt Rowan
Attorney, Agent, or Firm—Richard L. Miller

[57] ABSTRACT

This device is designed to keep fishing lines from tangling and also prevents fish hooks from accidentally becoming embedded in articles, people, upholstery, etcetera. The device utilizes a pair of inner sleeve halves that are of foam rubber form engaging with barbs of fish hooks, and a groove is provided for receiving a fishing pole. The design further includes a pair of outer sleeve halves that are hinged together to enable the device to open and close on the fishing pole, and a fishing line and a leader of a fish hook are held against the pole by the device, the device being held closed on the pole by a pair of attached hook and loop pile fasteners.

2 Claims, 1 Drawing Sheet

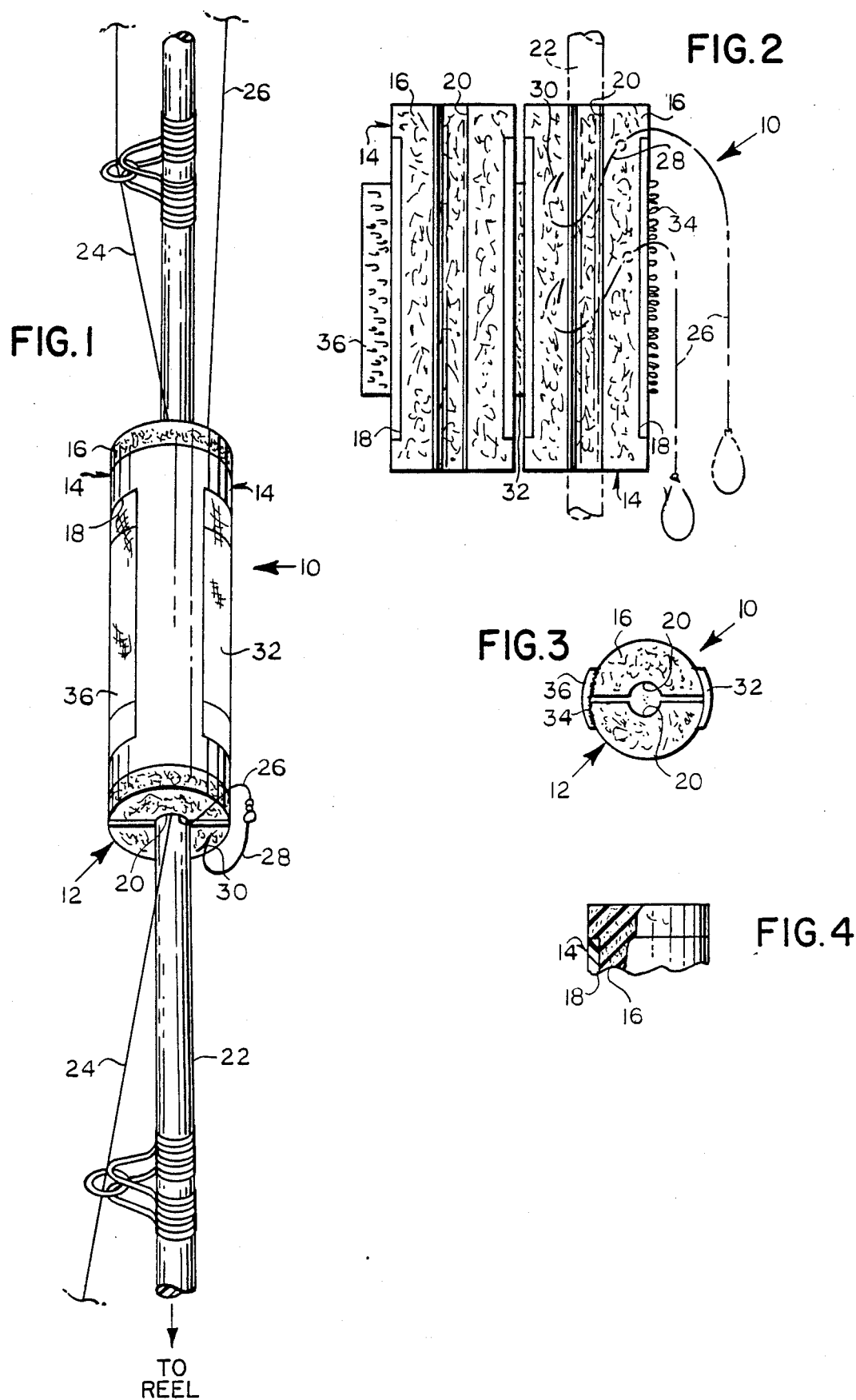

HOOK AND LINE MINDER

BACKGROUND OF THE INVENTION

The instant invention relates generally to fishing tackle, and more particularly, to a hook and line minder.

Numerous fishing tackle accessories have been provided in the prior art that are adapted to prevent tangled lines and accidentally embedded fish hooks. For example, U.S. Pat. Nos. 2,805,510 to Pamphilis; 2,829,461 to Tuttle; and 3,040,464 to Garrett et al all are illustrative of such prior art. While these units may be suitable for the particular purpose to which they address, they would not be as suitable for the purpose of the present invention as hereafter described.

SUMMARY OF THE INVENTION

A primary object of the present invention is to provide a hook and line minder that will overcome the shortcomings of the prior art devices.

Another object is to provide a hook and line minder that will be so designed, as to end a fisherman's frustration with tangled fishing lines and accidentally embedded fish hooks.

An additional object is to provide a hook and line minder that will encompass and fasten to a fishing pole, to hold the line and embed hooks therein.

A further object is to provide a hook and line minder that is simple and easy to use.

A still further object is to provide a hook and line minder that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view of the instant invention installed on a fishing pole;

FIG. 2 is a diagrammatic open plan view of the instant invention, showing storage of fish hooks illustrated in phantom;

FIG. 3 is a diagrammatic end elevational view of the instant invention per se; and FIG. 4 is a fragmentary side elevational view of the invention with parts broken away.

DETAILED DESCRIPTION OF THE PREFERRED EMBODIMENTS

Turning now descriptively to the drawings, in which like reference characters denote like elements throughout the several views, a device 10 is shown to include a cylindrical body 12 composed of a pair of semi-circular outer sleeve halves 14 and a pair of semicircular inner sleeve halves 16. Outer sleeve halves 14 are received in recessed areas 18 of the outer peripheral surfaces of inner sleeve halves 16, and a longitudinal and semi-circular groove 20 is provided in inner sleeve halves 16 and removably receives a fishing pole 22 and a fishing line 24 thereof.

A leader 26 of a fish hook 28 that is attached to the line 34, is also received in 20 to prevent tangling with line 24, and the barb 30 is engaged in the high density foam rubber that the inner sleeve halves 16 are typically fabricated of, for safety.

The outer sleeve halves 14 are fabricated preferably of plastic and a flexible hinge 32 is provided and fixedly secured to the outer periphery of outer sleeve halves 14 near one longitudinal edge, so as to enable the sleeve halves 14 and 16 to close and encompass fishing pole 22.

It shall also be recognized that other fish hooks 28 and their attached leaders 26 may be accommodated by device 10, the barbs 30 being embedded in inner sleeve halves 16, and the leaders 26 thereof being exposed outside of 10.

A pair of mating hook and loop pile fasteners 34 and 36 are provided for holding device 10 closed on the outer periphery of the fishing pole 22. The loop pile fastener 34 is fixedly secured to the outer peripheral surface of one semi-circular outer sleeve half 14, and the hook pile fastener 36 is similarly fastened to the other outer sleeve half and extends outward therefrom to overlap the loop pile fastener 34 for locking engagement.

In use, fishing line 24 is placed in a groove 20 alongside of the attached leader 26 of the fish hook 28, and the barb 30 is embedded in the foam rubber of inner sleeve halves 16. Storage of other leaders 26 is effected by also embedding the barbs 30 in the foam rubber material of the inner sleeve halves 16. The device 10 is then pivoted closed on the fishing pole 22 and the loop pile fasteners 34 and 36 are pressed together to firmly hold the device 10 in place on the pole 22.

Alternatively the flexible hinge 32 may be fabricated identically out of hook and loop pile fastener so that the device may be opened on either side.

Removal of device 10 is effected by pulling open the hook and loop pile fastener material with the user's fingers.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A hook and line minder device which comprises, a body removably attachable to a fishing pole for holding a fishing line, a fish hook leader, and an attached fish hook, a hinge means is secured to said body, for opening and closing said body, and a fastening means secured to said body for holding said body to said fishing pole, wherein said body is cylindrical and includes a longitudinal opening defined by a longitudinal groove provided in a pair of inner sleeve halves, and the longitudinal opening removably receives said fishing pole, wherein said pair of inner sleeve halves are fabricated of a resilient foam material wherein a barb of said fish hook may be embedded therein and retained for safety wherein a pair of outer sleeve halves are received in recessed areas provided in outer peripheral surfaces of said pair of inner sleeve halves and impart rigidity to said body and said hinge means is fabricated of a flexible material and is fixedly secured to portions of said pair of outer sleeve halves.

2. A hook and line minder device as recited in claim 1, wherein said fastening means is a pair of mating hook and loop pile material fixedly secured to an outer peripheral surface of said pair of outer sleeve halves.

* * * * *